United States Patent
Cousins et al.

(10) Patent No.: US 8,744,486 B2
(45) Date of Patent: *Jun. 3, 2014

(54) LOCATION RESTRICTED CONTENT DELIVERY OVER A NETWORK

(75) Inventors: David Cousins, Chandlers Ford (GB); Ian Partridge, Eastleigh (GB); Adam Pilkington, Eastleigh (GB); Dave Renshaw, Winchester (GB); Andrew Taylor, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 12/876,683

(22) Filed: Sep. 7, 2010

(65) Prior Publication Data

US 2011/0077026 A1    Mar. 31, 2011

(30) Foreign Application Priority Data

Sep. 25, 2009   (EP) ..................................... 09171386

(51) Int. Cl.
*H04W 24/00*    (2009.01)

(52) U.S. Cl.
USPC ..................... 455/456.2; 455/456.3; 455/411; 455/466; 455/414.1; 370/338; 725/34; 725/35; 705/14.54; 705/14.55; 705/14.58; 705/14.62

(58) Field of Classification Search
USPC ........ 455/410, 456.1, 404.1, 466, 411, 404.2, 455/414.1, 419, 432.1; 726/4, 5, 17, 21, 27; 463/29; 370/328–338; 725/34, 35, 106; 348/211.2, 211.3, 211.4; 705/14.53–14.65; 340/990, 426.18; 701/32.3, 408, 300

See application file for complete search history.

(56) References Cited

U.S. PATENT DOCUMENTS 5,956,408 A * 9/1999 Arnold .......................... 713/189
6,377,810 B1   4/2002 Geiger et al.

(Continued)

FOREIGN PATENT DOCUMENTS

| EP | 2 073 575 | * | 6/2009 |
| WO | 03007542 |   | 1/2003 |
| WO | PCT/SG01/00148 | * | 1/2003 |

OTHER PUBLICATIONS

U.S. Appl. No. 13/445,370 to the same inventor—No publication version can be located at this time.*

(Continued)

*Primary Examiner* — Quan M Hua
(74) *Attorney, Agent, or Firm* — Yee & Associates, P.C.; Yeen Tham

(57) ABSTRACT

Delivering content to a requesting device over a content delivery network, the content being deliverable in only one or more restricted geographic regions and the requesting device being communicatively connected to a cellular communications service provider via a cellular communications network, the method comprising steps of: receiving a network identifier of the requesting device uniquely identifying the requesting device in the cellular communications network; transmitting a verification message over the cellular communications network for receipt by the requesting device; receiving, from the requesting device, an access control submission; receiving, from the cellular communications service provider, location information corresponding to a geographic location of the requesting device; and in response to a determination that the access control submission derives from the transmitted verification message and the location information indicates the requesting device is in one of the one or more restricted geographic regions, delivering the content to the requesting device.

12 Claims, 5 Drawing Sheets

(56) References Cited

U.S. PATENT DOCUMENTS

| | | |
|---|---|---|
| 6,895,236 B2 | 5/2005 | Shuster |
| 7,218,914 B2 | 5/2007 | Shuster |
| 2002/0023010 A1* | 2/2002 | Rittmaster et al. ............... 705/26 |
| 2002/0083346 A1* | 6/2002 | Rowlands ..................... 713/201 |
| 2003/0023578 A1* | 1/2003 | Durand et al. ..................... 707/1 |
| 2003/0065715 A1* | 4/2003 | Burdick et al. ............... 709/203 |
| 2003/0236120 A1* | 12/2003 | Reece et al. ..................... 463/42 |
| 2004/0219904 A1 | 11/2004 | De Petris |
| 2006/0059096 A1* | 3/2006 | Dublish et al. .................. 705/57 |
| 2006/0224716 A1* | 10/2006 | Nakazawa et al. ............ 709/223 |
| 2007/0213032 A1* | 9/2007 | Shuster ......................... 455/410 |
| 2008/0022411 A1* | 1/2008 | Wendling et al. ............... 726/27 |
| 2008/0075033 A1* | 3/2008 | Shattil .......................... 370/328 |
| 2009/0202073 A1 | 8/2009 | Singhal et al. |
| 2012/0195427 A1 | 8/2012 | Cousins et al. |

OTHER PUBLICATIONS

Office Action regarding U.S. Appl. No. 13/445,370, dated May 22, 2012, 17 pages.
Response to Office Action regarding U.S. Appl. No. 13/445,370 dated Aug. 22, 2012, 10 pages.
Office Action regarding U.S. Appl. No. 13/445,370 dated Oct. 26, 2012, 16 pages.
USPTO Non Final Office Action, U.S. Appl. No. 13/445,370, Apr. 26, 2013, 29 pages.
Notice of Allowance, dated Nov. 13, 2014, regarding USPTO U.S. Appl. No. 13/445,370, 20 pages.

* cited by examiner

LOCATION RESTRICTED CONTENT DELIVERY OVER A NETWORK

This application claims the benefit of priority to European Patent Office Application Serial No. 09171386.7, filed on Sep. 25, 2009, which is hereby incorporated by reference.

BACKGROUND

1. Field

The present invention relates to the delivery of data content over a network. In particular, it relates to the delivery of data content to a requesting device only when the requesting device is located in an authorized geographic region.

2. Description of the Related Art

With the growth and prevalence of network-enabled devices, individuals are increasingly able to access a broad range of digital content such as media, software, information and other data. Access control to such content can require application of numerous criteria, including whether a user is approved or authorized to access specific content and whether content is available at a particular geographic location.

Restricting content to specific geographic regions is an increasing requirement as digital networks span regional and national boundaries. Regional statutory or regulatory differences and differences in regional licensing arrangements can require that content providers and content distributors impose such geographic restrictions on the availability of content. For example, a content provider streaming live sports coverage may only have a license for a certain country and they will need to prevent content requesters in other locations from accessing the coverage.

A simplistic solution is to require each content requester desiring to access content to register with a central authority to confirm their eligibility. This proves impractical when the content is being provided to large numbers of requesters in real time, and does not address the problem of requesters' moving geographic location, such as mobile devices suitable for requesting such content.

An approach often employed by content providers involves discerning the geographic location of a content requester based on a network address, such as an IP address. One such approach, known as GeoIP, takes user-entered location data from web-sites that ask web visitors to provide their geographic location (GeoIP is a registered trademark of MaxMind, Inc.). Large numbers of such datasets are then processed by a series of algorithms that identify, extract, and extrapolate location points for IP addresses. While this approach can prove effective, it suffers from the drawback that the required datasets must be generated and maintained. Further, the approach does not detect the actual location of a content requester where the requester communicates via an intermediary, such as a device communicating through a proxy server operating in a different geographic region. Yet further, some IP networks are shared across geographies and so cannot be easily or accurately associated with a single geographic location.

Related U.S. Pat. Nos. 6,895,236 and 7,218,914 disclose methods for verifying the purported location of a wide area network user. The methods of these patents involve geographically restricted broadcasting of an access code such that only geographically authorized users within the restricted broadcast region can receive such codes and so can access location sensitive content. Since such a technique involves the public broadcast of access codes, there is no targeting to limit access to such access codes to users on a basis such as subscription or other authorization without further access control technology. Further, the approach does not address the malicious sharing of access codes outside the broadcast region through other technical means, such as receipt and retransmission.

U.S. Pat. No. 6,377,810 discloses the generation of location information at a mobile device using a global positioning receiver (GPS) at the same location. This approach depends on trust in the mobile device which cannot always be assured, especially where flexibility and compatibility between many such devices is desired. The approach is especially fallible in respect of spoof GPS location data generated by malicious devices or software.

Thus, there is a need to verify the location of an untrusted device from which requests for location sensitive content originate.

SUMMARY

The present invention accordingly provides, in a first aspect, a method for delivering content to an untrusted requesting device over a content delivery network, the content being deliverable in only one or more restricted geographic regions and the requesting device being communicatively connected to a cellular communications service provider via a cellular communications network, the method comprising the steps of: receiving a network identifier of the requesting device uniquely identifying the requesting device in the cellular communications network; transmitting a verification message over the cellular communications network using the network identifier for receipt by the requesting device; receiving, from the requesting device, an access control submission; receiving, from the cellular communications service provider, location information corresponding to a geographic location of the requesting device; and in response to a determination that the access control submission derives from the transmitted verification message and the location information indicates the requesting device is in one of the one or more restricted geographic regions, delivering the content to the requesting device.

Thus, location information is obtained from the cellular communications service provider as an independent third party for the untrusted requesting device. Also, the untrusted requesting device is verified to be the device from which content requests originate and to which content is proposed to be delivered. The content provider can therefore determine whether the location of the untrusted requesting device is authorized to receive requested content and provide such content as appropriate.

The present invention accordingly provides, in a second aspect, an apparatus for delivering content to an untrusted requesting device over a content delivery network, the content being deliverable in only one or more restricted geographic regions and the requesting device being communicatively connected to a cellular communications service provider via a cellular communications network, the apparatus comprising: receiving means for receiving a network identifier of the requesting device uniquely identifying the requesting device in the cellular communications network; transmitting means for transmitting a verification message over the cellular communications network using the network identifier for receipt by the requesting device; receiving means for receiving, from the requesting device, an access control submission; receiving means for receiving, from the cellular communications service provider, location information corresponding to a geographic location of the requesting device; and content delivery means for, in response to a determination that the access control submission derives from the transmitted verification message and the location information indicates the requesting device is in one of the one or more restricted geographic regions, delivering the content to the requesting device.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE SEVERAL VIEWS OF THE DRAWINGS

A preferred embodiment of the present invention is described below in more detail, by way of example only, with reference to the accompanying drawings, in which.

DETAILED DESCRIPTION

Figure 1:
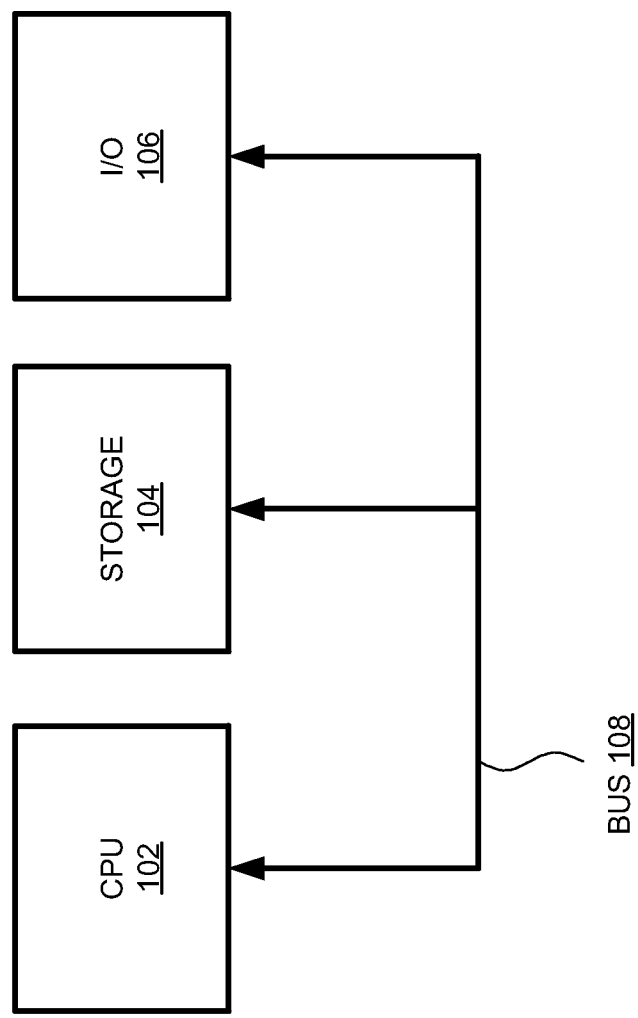
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
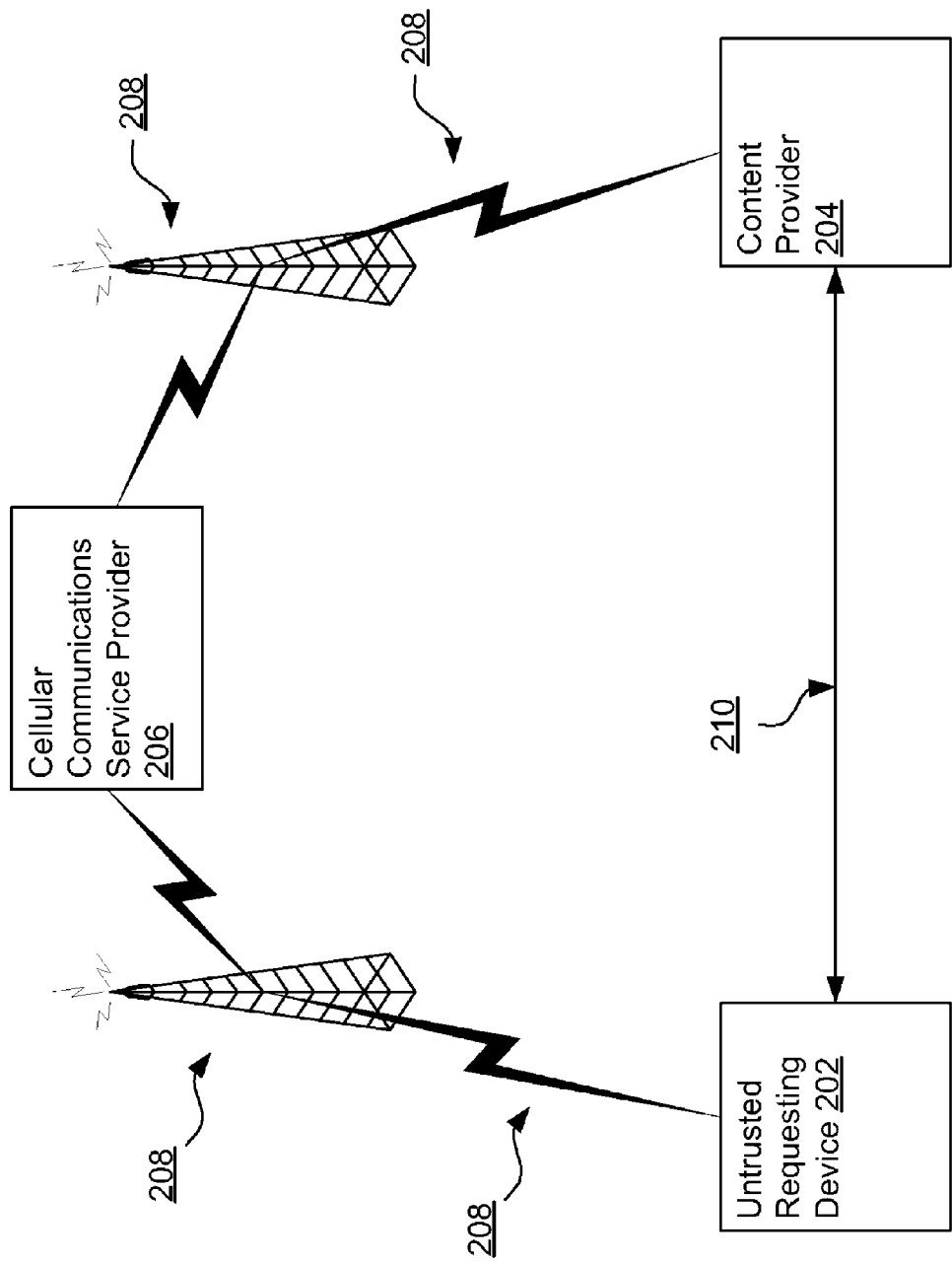
FIG. 2 is a block diagram illustrating an arrangement of a content provider, a content requester, and cellular communications provider communicating via a content delivery network and a cellular communications network in accordance with a preferred embodiment of the present invention.

FIG. 2 is a block diagram illustrating an arrangement of a content provider 204, an untrusted requesting device 202, and a cellular communications provider 206 communicating via a content delivery network 210 and a cellular communications network 208 in accordance with a preferred embodiment of the present invention.

Content provider 204 is a hardware or software entity for providing data content to content requesters over the content delivery network 210. Data content can include media (such as audio, video, images or text), software (such as software application packages, application user interfaces or cloud computing applications), information (such as news, weather, reference data, online articles or magazines) or any other data. For example, content provider 204 is a streaming media server for delivering audio and video content. The content delivery network 210 is a wired or wireless communications network suitable for content requesters to request, and content providers to transmit, data content. Content delivery network 210 can be specifically adapted to accommodate a certain type or types of content, such as a high-bandwidth network for the delivery of video and audio data. Content delivery network 210 can include a communications network provided via a cellular communications service such as 3 G or EDGE (Enhanced Data Rates for GSM Transmission).

Untrusted requesting device 202 is a content requester in communication with the content provider 204 via the content delivery network 210. The untrusted requesting device 202 is potentially any device that is suitable for communicating with content providers and being adapted to communicate with the cellular communications service provider 206 over a cellular communications network. For example, untrusted requesting device 202 can be a mobile telephone handset having 3 G capabilities for requesting and receiving content over a cellular 3 G network. It will therefore be apparent to those skilled in the art that the content delivery network 210 can constitute part of the cellular communications network 208, such as an internet protocol (IP) connection over a 3 G network provided by the cellular communications service provider 206.

The cellular communications service provider 206 provides the cellular communications network 208 as a network communications service for mobile transceivers including devices such as mobile network access devices, telephony devices and content requesters such as untrusted requesting device 202. For example, cellular communications network 208 is used by mobile cellular telephones, broadband access devices such as broadband dongles etc. The cellular communications network 208 can be a radio network made up of a number of radio cells each served by at least one fixed-location transceiver known as a cell site or base station. The cells in cellular communications network 208 cover different regional areas to provide network coverage over a wider area than the area of any one cell so that a variable number of portable transceivers can be used in any one cell and moved through more than one cell during transmission. The cellular communications service provider 206 is operable to interpret information from the cellular communications network 208 to determine a physical location of a transceiver connected to the cellular communications network 208, such as by way of determining which communications cell the device is operating within. For example, the cellular communications service provider 206 can determine a communications cell in which the untrusted requesting device 202 is located. In this way the cellular communications service provider 206 is able to provide location information for the untrusted requesting device 202.

In use, the untrusted requesting device 202 requests content from the content provider 204 over the content delivery network 210. The untrusted requesting device 202 sends the content provider 204 a network identifier that uniquely identifies the untrusted requesting device 202 in the cellular communications network. For example, the network identifier can be a cellular telephone number or a network or network adapter address. Using the unique identifier, the content provider 204 communicates with the cellular communications service provider 206 via the cellular communications network 208 to obtain location information for the untrusted requesting device 202. Further, to verify that the untrusted requesting device 202 is the same device as that for which location information is generated, a verification message is transmitted to the untrusted requesting device 202 via the cellular communications network 208. The verification message is used by a user of the untrusted requesting device 202 to provide an access control submission to the content provider 204 over the content delivery network 210. The access control submission is derived from the verification message such that the content provider 204 can verify that the untrusted requesting device 202 for which content is requested is the same device as that to which the verification message was transmitted and that for which the cellular communications service provider 206 provides location information. The access control submission can be derived from the verification message in any suitable way such as by being the same as the verification message, an identifying part of the verification message, or a processed, encrypted or signed version of the verification message, for example.

In this way, the content provider 204 is able to obtain location information from the cellular communications service provider 206 as an independent third party for the untrusted requesting device 202 and is able to verify that the untrusted requesting device 202 is the device from which content requests originate and to which content can be delivered. Thus, the content provider 204 can determine whether the location of the untrusted requesting device 202 is authorized to receive requested content and provide such content as appropriate.

Figure 3:
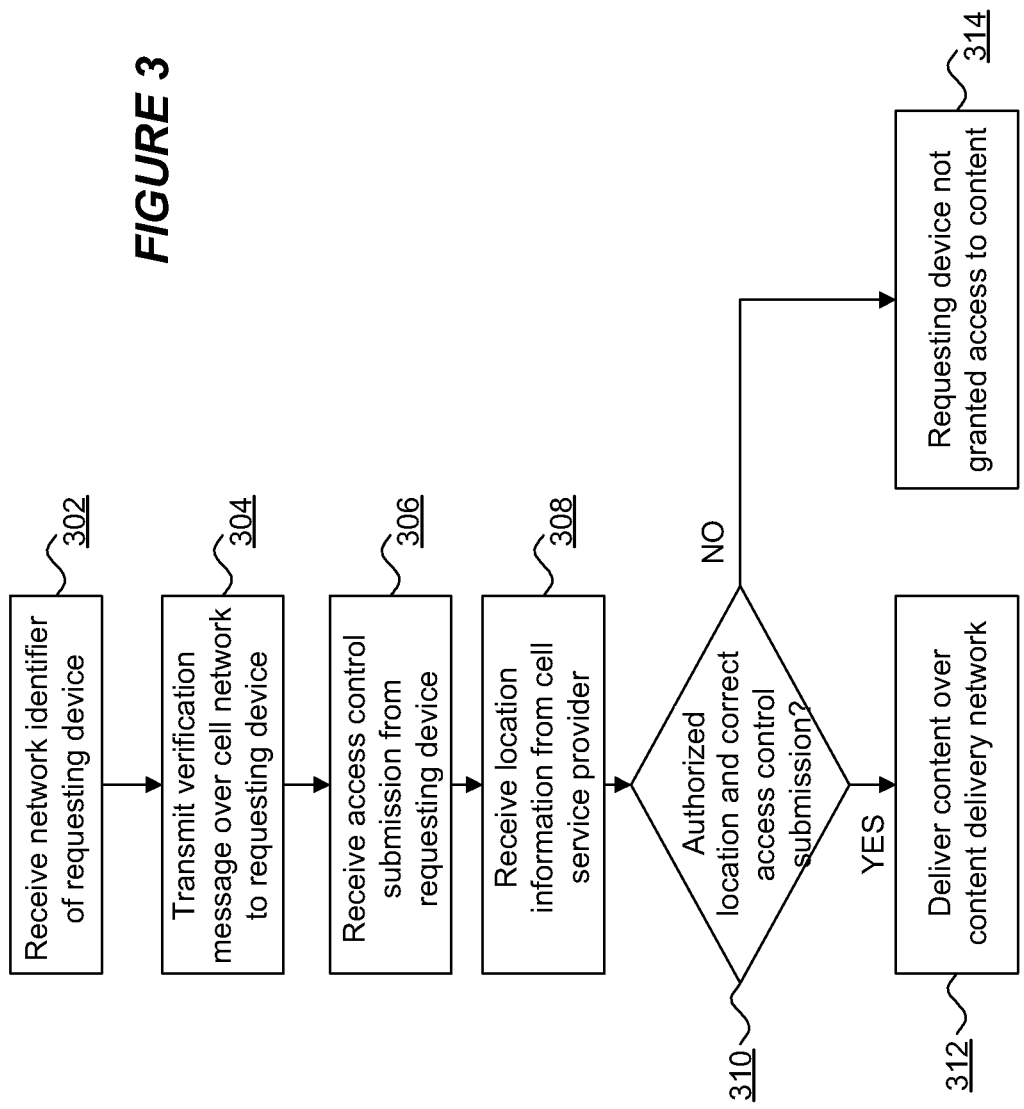
FIG. 3 is a flowchart of a method for delivering content to the untrusted requesting device over the content delivery network in accordance with a preferred embodiment of the present invention.

FIG. 3 is a flowchart of a method for delivering content to the untrusted requesting device 202 over the content delivery network 210 in accordance with a preferred embodiment of the present invention. At step 302 the content provider 204 receives a network identifier, such as a telephone number, from the untrusted requesting device 202. At step 304 the content provider 204 transmits a verification message over the cellular communications network 208 to the untrusted requesting device 202. At step 306 the content provider 204 receives an access control submission from the untrusted requesting device 202 over the content delivery network 210. At step 308 the content provider 204 receives location information for the untrusted requesting device 202 from the cellular communications service provider 206. At step 310 the method determines if the location of the untrusted requesting device 202 is authorized to receive the requested content and if the access control submission is derived from the verification message. Where the determination at step 310 is affirmative, the content provider 204 proceeds to communicate the requested content to the untrusted requesting device 202 at step 312. Where the determination at step 310 is negative, the content provider 204 does not communicate the requested content.

Figure 4:
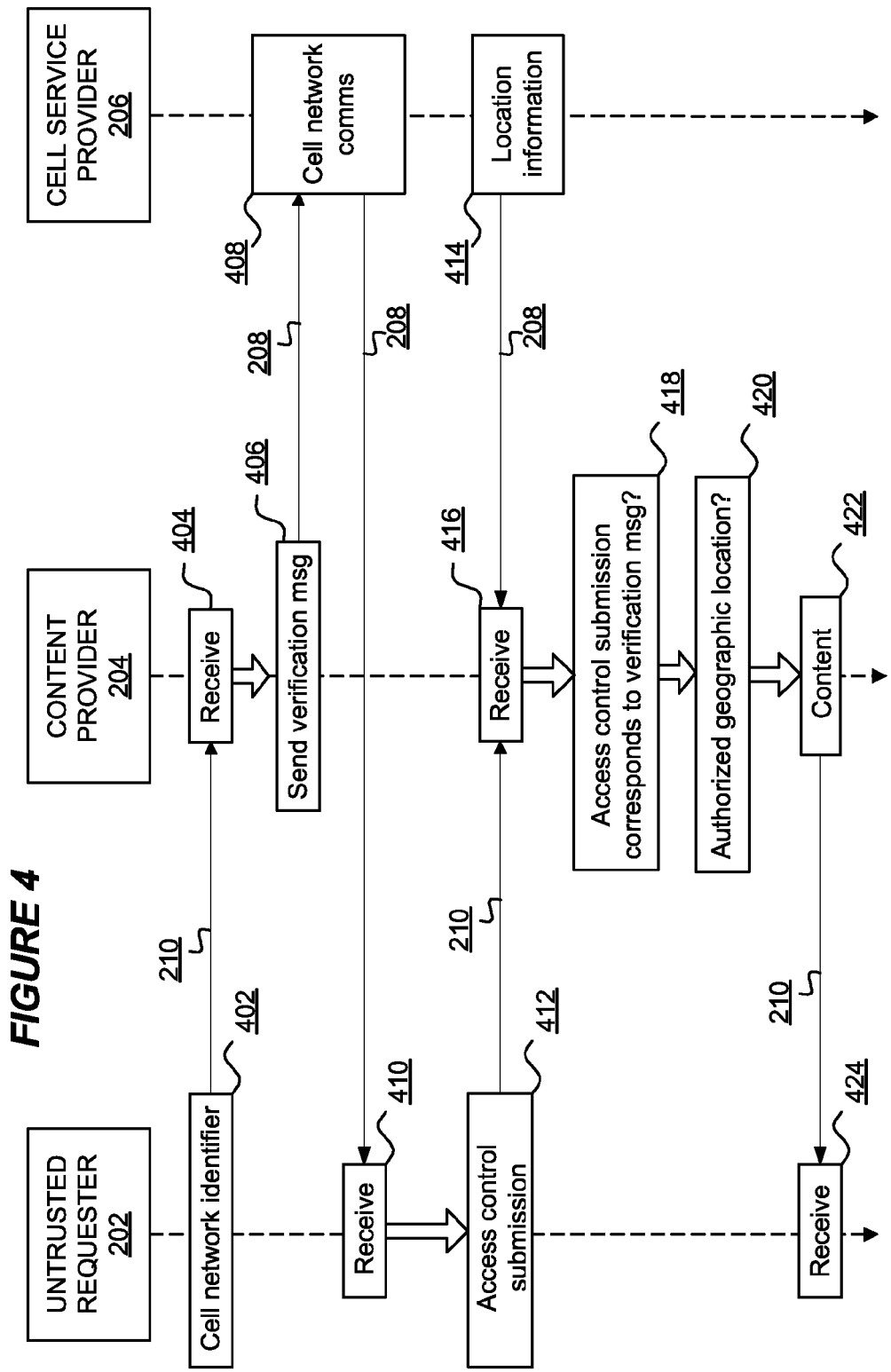
FIG. 4 is an event flow diagram illustrating the sequence of events in delivering content to the untrusted requesting device over the content delivery network in accordance with a preferred embodiment of the present invention.

FIG. 4 is an event flow diagram illustrating a sequence of events in delivering content to the untrusted requesting device 202 over the content delivery network 210 in accordance with a preferred embodiment of the present invention. The untrusted requesting device 202 initially communicates a cell network identifier 402 such as a cellular telephone number to the content provider 204 over the content delivery network 210. The content provider 204 receives at event 404 the identifier and sends a verification message 406 to the untrusted requesting device 202 via the cellular communications network 208 at event 408. For example, the verification message is sent to the untrusted requesting device 202 as a Short Message Service (SMS) message. The untrusted requesting device 202 receives the verification message at event 410, and a user at the untrusted requesting device 202 makes an access control submission 412 to the content provider 204 via the content delivery network 210. The access control submission at event 412 is based on the received verification message such that it is derived from the verification message. At the same time as event 412, or before or after event 412, the cellular communications service provider 206 sends location information 414 to the content provider 204. The location information identifies a geographic location of the untrusted requesting device 202 such as a particular cell covering a defined geographic region in the cellular communications network 208. The content provider 204 receives the access control submission 412 and the location information 414 at event 416, and proceeds to determine if the access control submission is derived from the verification message at event 418, and that the requesting device is located in an authorized geographic location at event 420. Where these determinations are affirmative, the content provider 204 communicates the requested content to the requesting device over the content delivery network 206 at event 422, for receipt by the requesting device at event 424. Where the determinations at event 418 or 420 are negative, the communication of content to the untrusted requesting device 202 at event 422 is prevented from taking place.

Figure 5:
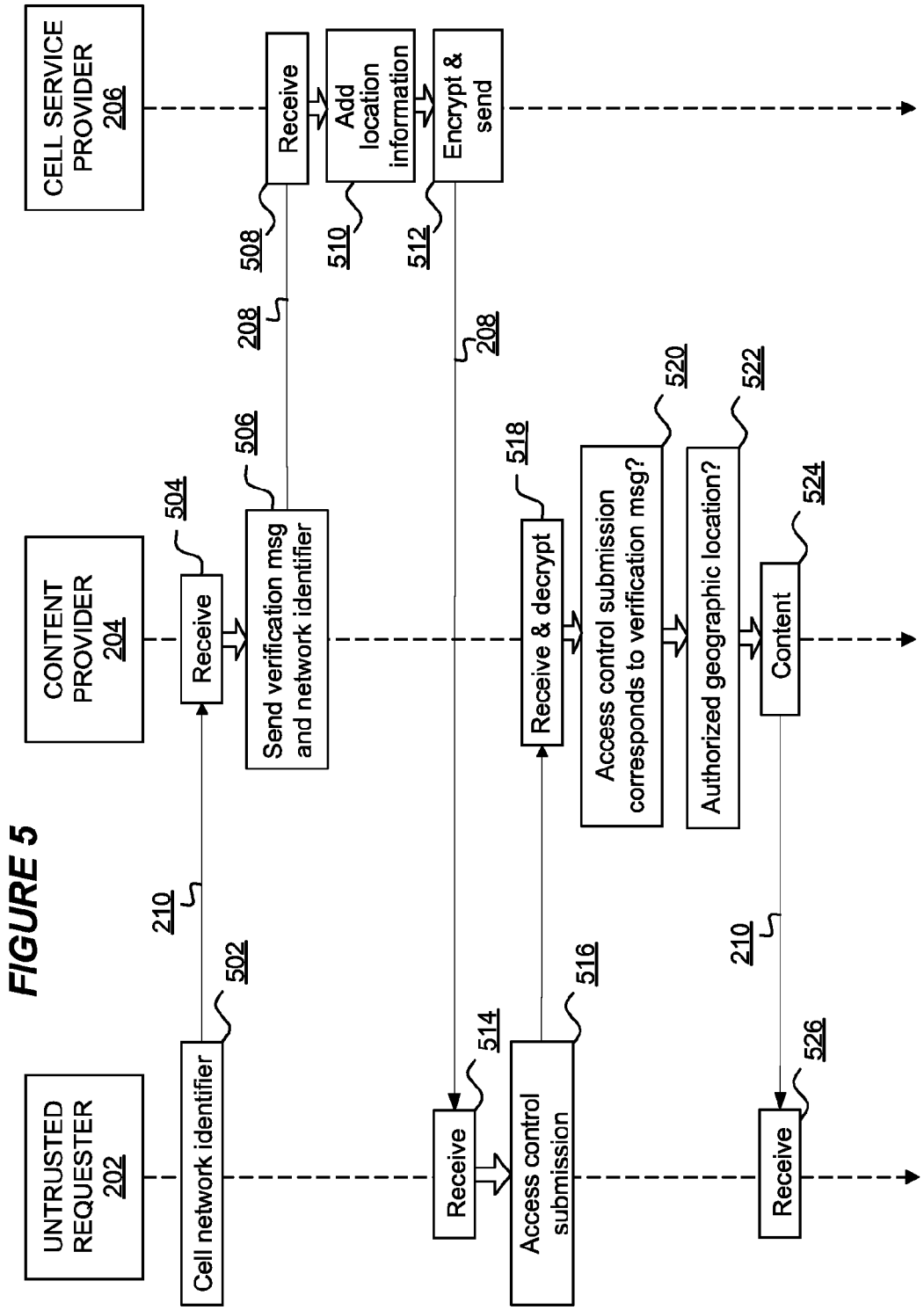
FIG. 5 is an event flow diagram illustrating the sequence of events in delivering content to the untrusted requesting device over the content delivery network in accordance with an alternative embodiment of the present invention.

FIG. 5 is an event flow diagram illustrating a sequence of events in delivering content to the untrusted requesting device 202 over the content delivery network 210 in accordance with an alternative embodiment of the present invention. The alternative arrangement of FIG. 5 provides the benefit of the preferred embodiment of the present invention described above without a need for the cellular communications service provider 206 to respond directly to the content provider 204 with location information. Instead, the location information is included within the access control submission received by the content provider 204 from the requesting device. The untrusted requesting device 202 initially communicates a cell network identifier 502, such as a cellular telephone number, to the content provider 204 over the content delivery network 210. The content provider 204 receives the identifier at event 504, and sends a verification message 506 and the cellular network identifier over the cellular communications network 208 to be received by the cellular communications service provider 206. The cellular communications service provider 206 determines a location of the untrusted requesting device 202 using the cell network identifier, and creates a message for the untrusted requesting device 202 including the verification message and the location information. The message for the untrusted requesting device 202 is encrypted by the cellular network service provider 206 such that it can be decrypted by the content provider 204 but not by the untrusted requester 202. For example, the cellular network service provider 206 can encrypt the message using a public key associated with a private key for the content provider 204. The encrypted message is sent to the requesting device 524 over the cellular communications network 208, and is used by the requesting device as a basis for an access control submission 516. The access control submission 516 in this embodiment includes the encrypted message from the cellular communications service provider 206, and is sent to the content provider 204 where it is received and decrypted, such as by using a private key for the content provider 204. The content provider 204 proceeds to determine if the access control submission is derived from the verification message at event 520, and that the requesting device is located in an authorized geographic location at event 522. Where these determinations are affirmative, the content provider 204 communicates the requested content to the requesting device over the content delivery network 206 at event 524, for receipt by the requesting device at event 526. Where the determinations at event 520 or 522 are negative, the communication of content to the requesting device 202 at event 524 is prevented from taking place.

In this way the location information is communicated to the content provider 204 by the cellular communications service provider 206 via the untrusted requesting device 202. The requesting device is unable to tamper or spoof the location information since it is encrypted by the cellular communications service provider 206. In a further alternative embodiment, only the location information is encrypted by the cellular communications service provider 206 at event 512, and the verification message is allowed to remain unencrypted.

In yet a further embodiment, the cellular communications service provider 206 digitally signs the encrypted message at event 512.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. An apparatus for delivering content to a requesting device over a content delivery network, the content being deliverable in only one or more restricted geographic regions and the requesting device being communicatively coupled to a cellular communications service provider via a cellular communications network, the apparatus comprising:
   a central processor unit (CPU), a computer readable memory and a computer readable storage media;
   first program instructions to receive a network identifier of the requesting device uniquely identifying the requesting device in the cellular communications network;
   second program instructions to transmit a verification message over the cellular communications network using the network identifier for receipt by the requesting device;
   third program instructions to receive, from the requesting device, an access control submission over the content delivery network;
   fourth program instructions to receive, from the cellular communications service provider, location information corresponding to a geographic location of the requesting device; and
   fifth program instructions, in response to a determination that the access control submission derives from the transmitted verification message and the location information indicates the requesting device is in one of the one or more restricted geographic regions, to deliver the content to the requesting device;
   wherein the verification message is a secret shared with the cellular communications service provider, and the location information is received from the cellular communications service provider in the access control submission via the requesting device, and wherein the location information and the verification message are encrypted by the cellular communications service provider using a public key corresponding to a private key for a provider of the content; and wherein
   the first, second, third, fourth and fifth program instructions are stored on the computer readable storage media for execution by the CPU via the computer readable memory.

2. The apparatus of claim 1 wherein the location information is received from the cellular communications service provider in the access control submission via the requesting device, and wherein the location information is encrypted by the cellular communications network using a public key corresponding to a private key for a provider of the content, and wherein the encrypted location information is signed by the cellular communications service provider using a digital signature.

3. The apparatus of claim 1, wherein the network identifier is one of a telephone number and a network address.

4. The apparatus of claim 1, wherein the verification message is received by the requesting device as a short message service (SMS) message.

5. The apparatus of claim 1, wherein the content delivery network is provided by the cellular communications network.

6. A computer program element comprising a tangible computer usable storage device having computer program code stored thereon to, when loaded into a computer system and executed thereon, causes the computer system to perform the steps of:
   receiving a network identifier of the requesting device uniquely identifying the requesting device in the cellular communications network;
   transmitting a verification message over the cellular communications network using the network identifier for receipt by the requesting device;
   receiving, from the requesting device, an access control submission over the content delivery network;
   receiving, from the cellular communications service provider, location information corresponding to a geographic location of the requesting device; and
   in response to a determination that the access control submission derives from the transmitted verification message and the location information indicates the requesting device is in one of the one or more restricted geographic regions, delivering the content to the requesting device, wherein the verification message is a secret shared with the cellular communications service provider, and the location information is received from the cellular communications service provider in the access control submission via the requesting device, and wherein the location information and the verification message are encrypted by the cellular communications service provider using a public key corresponding to a private key for a provider of the content.

7. The apparatus of claim 1, wherein the first program instructions to receive the network identifier of the requesting device, the second program instructions to transmit the verification message over the cellular communications network and the fifth program instructions to deliver the content to the requesting device are performed by a content provider that delivers content to the requesting device using the cellular communications network.

8. The apparatus of claim 7, wherein the location information is determined by the cellular communications service provider as a cell location for a cell in the cellular communications network within which the requesting device is communicating.

9. The apparatus of claim 7, wherein the determination that the access control submission derives from the transmitted verification message includes a determination that the access control submission includes the verification message.

10. The apparatus of claim 1, wherein the second program instructions to transmit the verification message over the cellular communications network is performed in response to the first program instructions to receive the network identifier of the requesting device.

11. The apparatus of claim 1, wherein the verification message is transmitted to the requesting device over the cellular communications network.

12. The apparatus of claim 7, further comprising:
sixth program instructions to receive the verification message at the requesting device; and
seventh program instructions to submit the access control submission to the content provider by the requesting device, wherein the access control submission is based on the received verification message such that it is derived from the verification message.

* * * * *